US006328596B1

(12) United States Patent
Chess et al.

(10) Patent No.: US 6,328,596 B1
(45) Date of Patent: Dec. 11, 2001

(54) PLUG AND CABLE FOR INFORMATION APPLIANCES

(75) Inventors: David Chess, Mohegan Lake; Ian Whalley, Ossining, both of NY (US); Steve Weingart, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,582

(22) Filed: Apr. 6, 2000

(51) Int. Cl.[7] .................................................... A01R 11/00
(52) U.S. Cl. ............................................ 439/502; 439/701
(58) Field of Search .................................... 439/304, 305, 439/701, 502

(56) References Cited

U.S. PATENT DOCUMENTS

| | | | | |
|---|---|---|---|---|
| 4,156,869 | | 5/1979 | Schukantz | 340/310 |
| 4,373,777 | | 2/1983 | Borsuk et al. | 350/96.2 |
| 4,778,399 | | 10/1988 | Schenk | 439/147 |
| 4,866,757 | | 9/1989 | Nilssen | 379/90 |
| 4,898,542 | * | 2/1990 | Jones, Jr. | 439/371 |
| 5,133,671 | * | 7/1992 | Boghosian | 439/371 |
| 5,320,555 | * | 6/1994 | Okabe | 439/701 |
| 5,397,929 | | 3/1995 | Hogarth et al. | 307/140 |
| 5,419,717 | * | 5/1995 | Abendschein et al. | 439/247 |
| 5,733,138 | * | 3/1998 | Kramer | 439/369 |
| 5,792,986 | * | 8/1998 | Lee | 439/502 |
| 5,834,698 | | 11/1998 | Izui et al. | 174/113 R |
| 5,967,818 | * | 10/1999 | Carron et al. | 439/211 |
| 5,984,717 | * | 11/1999 | Lee | 439/502 |

FOREIGN PATENT DOCUMENTS

| | | | | |
|---|---|---|---|---|
| 0112183 | * | 4/1990 | (JP) | 439/502 |
| 0288176 | * | 11/1990 | (JP) | 439/502 |

* cited by examiner

*Primary Examiner*—Renee Luebke
*Assistant Examiner*—Briggitte R. Hammond
(74) *Attorney, Agent, or Firm*—Ohlandt, Greeley, Ruggiero & Perle, LLP; Gail H. Zarick, Esq.

(57) ABSTRACT

An improved plug and cable combination for connecting information appliances to an information socket and to a power socket, comprising a power conductor for transferring power from the power socket to the information appliance. The power conductor having a power plug at a first end, the power plug adapted to connect to the power socket. An information conductor for transferring information from the information socket to the information appliance. The information conductor having an information plug at a first end, the information plug adapted to connect to the information socket. A second end of the power conductor and a second end of the information conductor terminate at the information appliance. The information plug and the power plug having a plug joining means disposed thereon, wherein the plug joining means being capable to integrate the information plug and the power plug into an integrated plug.

20 Claims, 6 Drawing Sheets

PLUG AND CABLE FOR INFORMATION APPLIANCES

FIELD OF THE INVENTION

This invention relates to the plugs and cables used with information appliances such as, but not limited to, computers and computer controlled appliances.

BACKGROUND OF THE INVENTION

Acceptance of information appliances, such as computers and computer controlled appliances, by the general consumer public is desired. One factor that will aid in this acceptance is ease of installation. For example, the information appliances should be as simple to assemble and install as non-information appliances, such as toasters.

One of the barriers to simplifying the installation of information appliances is the number of ports that a typical information product has to plug into. For instance, typical information products must be plugged into at least one information socket, such as a telephone or coaxial socket, and at least one power socket, such as common household 110 volt electrical sockets. Additionally, in most homes and businesses, the sockets for information and power are not located in close proximity to one another. This requires not only two plugging-in operations, but also the running of conductors to the two remote locations.

Eventually, newer businesses and homes will have power and information/data sockets that are further integrated into a single socket. In this instance, a single outlet will supply both power and data, thus requiring only one cable and only one plugging-in operation. However, the widespread availability of such sockets will not occur for some time, and there will be a significant transition period, during which some consumers have the new integrated outlets, and some have the old separate power and data outlets.

For the manufacturers and suppliers of information appliances, significant expense will be required to produce two different models of every information appliance, or to provide two kinds of power cables, or to provide special cable adapters in order to accommodate users with the older and the newer sockets.

The prior art teaches combined power-and-data outlets and also teaches combined power-and-data cables.

U.S. Pat. No. 5,397,929 to Hogarth et al. provides an integrated outlet that allows supply of AC power to an outlet receptacle when certain conditions are satisfied. The integrated outlet contains separate modules that establish electrical connection with electrical conductors that transmit AC and DC power, telecommunications, control communications, and signals transmitted along a coaxial conductor. In a preferred embodiment, these electrical conductors are all disposed on a single ribbon cable.

U.S. Pat. No. 4,778,399 to Schenk provides a multi-service electrical outlet module which combines at a single location the outlets for connection to various electrical systems such as power, telephone, computer systems and television antenna. The outlet module is comprised of a housing having a chamber centrally disposed within the housing. Fixed within the chamber are mounting plates which carry the outlets for connection to the various electrical systems. These outlets will include ones for reception of the connectors of cables such as those associated with power supply, ribbon wires, telephone service, radio wave signal reception, and coaxial cable service.

U.S. Pat. No. 4,866,757 to Nilssen provides a combined telephone and power distribution system. The system transmits both telephone signals and Class-2 high frequency electric power from a central point by way of a common transmission cable to the location of a telephone apparatus. Thus, the system provides at that location, not only telephone signals, but also a limited amount of electric power useful for various things, such as task lighting. The common transmission cable is an ordinary telephone cable wherein at the location of the telephone apparatus, some of the wires in the cable are connected with the telephone, and some of the wires in the cable are connected with a fluorescent task lighting fixture.

U.S. Pat. No. 4,156,869 to Schukantz provides a cable for conveying control or other information signals of selected frequencies and for simultaneously conveying a selected amount of electric power. The cable has a central conducting means, a material of selected dielectric coefficient which surrounds the central conducting means, and an outer conducting means which is positioned around the dielectric. The outer conducting means cooperates with the central conducting means to provide a first path through which the information signals are conveyed, and one of the conducting means providing a second path through which the electric power is conveyed. Thus, the conducting means perform a dual conductive function.

U.S. Pat. No. 5,834,698 to Izui et al. provides a composite cable with built-in signal and power cables. This composite cable is mainly used as a control cable for numerical controlled machine tools. The composite cable contributes to reduced cost since it requires only a single cable to be laid, as compared to conventional cables which require laying of multiple cables. The composite cable has one or more power cables provided in the center of the composite cable and having a large conductor size. The composite cable also has a flat signal cable formed by a plurality of insulated cores arranged in parallel in the lengthwise direction of the flat signal cable. The flat signal cable has alternately repeated combined portions and separated portions, which are spirally wound around the power cables into a roll.

U.S. Pat. No. 4,373,777 to Borsuk et al. provides a combined fiber optic and electrical connector member in which the metallic conductors of a cable coupled to the connector member extend through a hollow sleeve while the optical fibers of the cable are spirally wound around the sleeve in a flex chamber, thereby reducing bend radiation losses through the fibers when the connector member is engaged with a mating connector member.

Accordingly, it is an object of the invention to provide A plug and cable that functions as a single integrated cord for use with new integrated sockets, but can be easily separated into two separate cords, for at least part of its length, for use with older non-integrated sockets.

DETAILED DESCRIPTION OF THE INVENTION

The present invention provides an information appliance with a cord that functions as a single integrated cord for use with integrated sockets, but that also functions as more than one cord by separation into at least two separate cords, for at least part of its length, for use with non-integrated sockets.

Figure 1A:
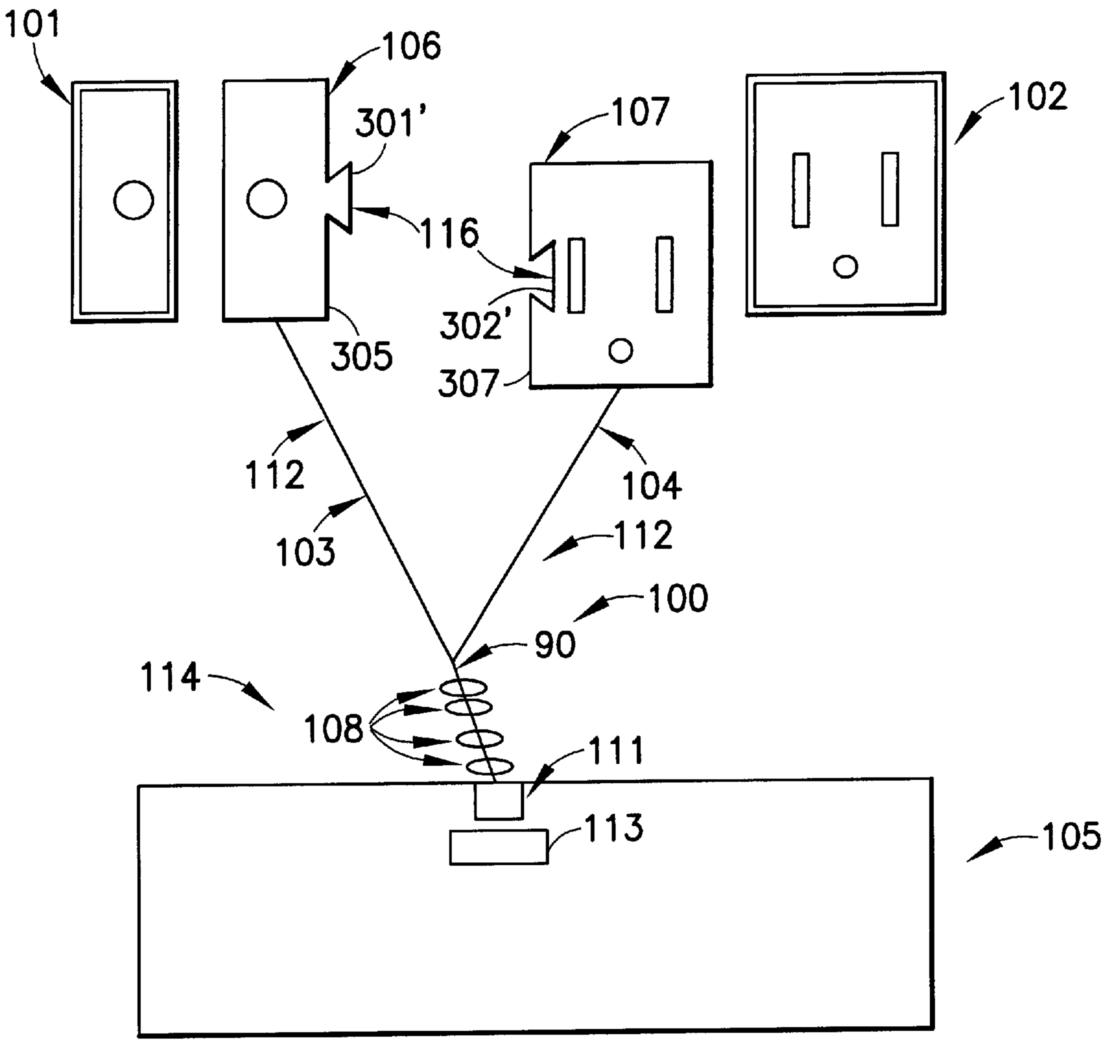
FIG. 1*a* is a schematic showing a first embodiment of the present invention used with separate power and information sockets.
Figure 1B:
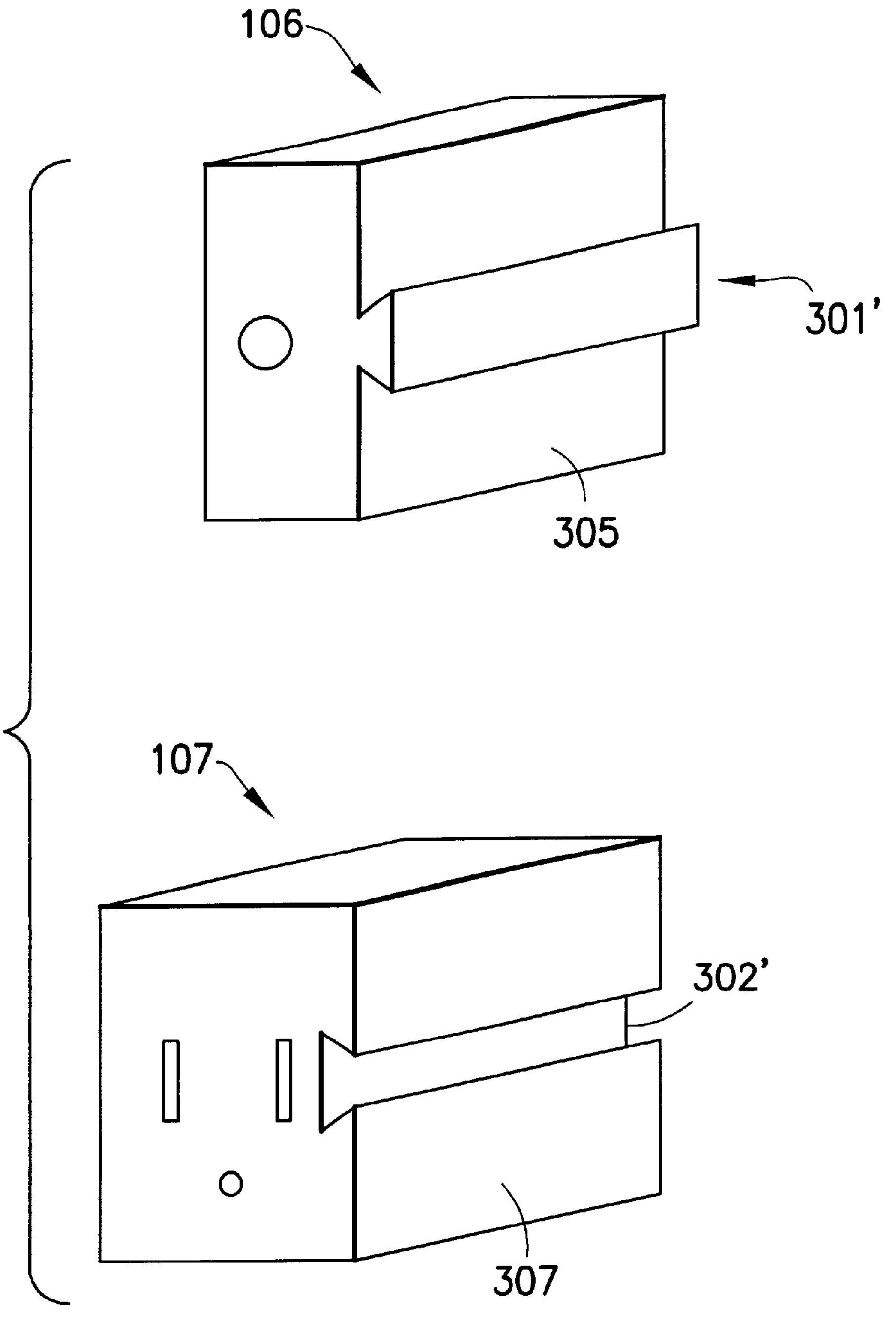
FIG. 1*b* is a perspective view of the plug joining mechanism of FIG. 1*a;*

FIG. 1 illustrates a cable apparatus incorporating a first embodiment of the present invention. The cable, designated generally as 100, is shown in use with an information socket 101 and with a power socket 102 that are not integrated. Cable 100 includes at least two sub-cables 112, that when integrated form integrated section 90. In the embodiment of FIG. 1, cable 100 includes two sub-cables 112, specifically an information conductor or conductor 103 and a power conductor or conductor 104. In alternate embodiments, more than two sub-cables 112 are included in cable 100. It should be noted that information conductor 103 could be one or more copper conductors, aluminum conductors, etc., and/or one or more optical conductors.

The flow of power in power conductor 104 may create an interference with data flowing in information conductor 103 in integrated section 90 or when power conductor 104 and information conductor 103 are in close proximity to one another. One or both conductors are suitably insulated or shielded, using methods known to the art, to prevent this interference.

Information conductor 103 and power conductor 104 terminate at device plug 111. Device plug 111 is an integrated plug adapted to be engaged with a device socket 113 disposed on a device 105. Alternately, information conductor 103 and power conductor 104 can connect directly to device 105 by connecting to a connection terminal 119 on device 105, as shown in FIG. 2.

Information conductor 103 has an information plug 106 adapted to be engaged with information socket 101. Power conductor 104 has a power plug 107 adapted to be engaged with power socket 102. Information plug 106 and power plug 107 each include a plug joining mechanism 116 for engagedly connecting the plugs 106 and 107 into an integrated plug 201, as shown in FIG. 2.

A cable joining mechanism 114, disposed on information conductor 103 and power conductor 104, allows the cables to integrate into integrated section 90. Cable joining mechanism 114 allows information conductor 103 and power conductor 104 to separate into sub-cables 112, for at least part of the length of cable 100, for use with older non-integrated sockets. In the embodiment of FIG. 1, joining mechanism 114 is embodied as a plurality of rings 108. Rings 108 slidably encircle information conductor 103 and power conductor 104. Rings 108, when spaced along the length of cable 100 away from device 105, integrate information conductor 103 and power conductor 104 into integrated section 90. Rings 108, when retracted toward the device 105, allow information conductor 103 and power conductor 104 to separate.

Figure 2:
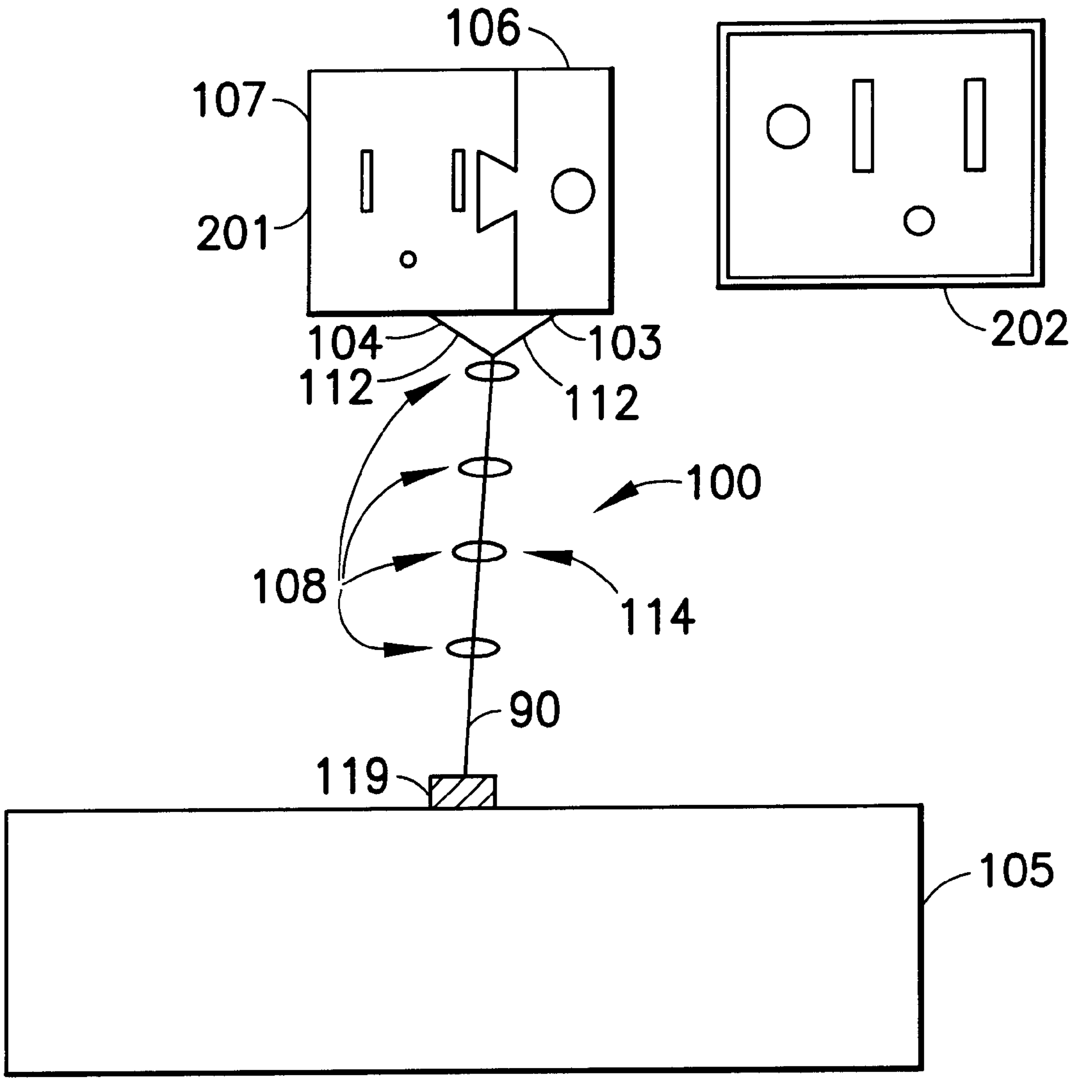
FIG. 2 is a schematic showing the first embodiment of the present invention used with combined power and information sockets.
Figure 5:
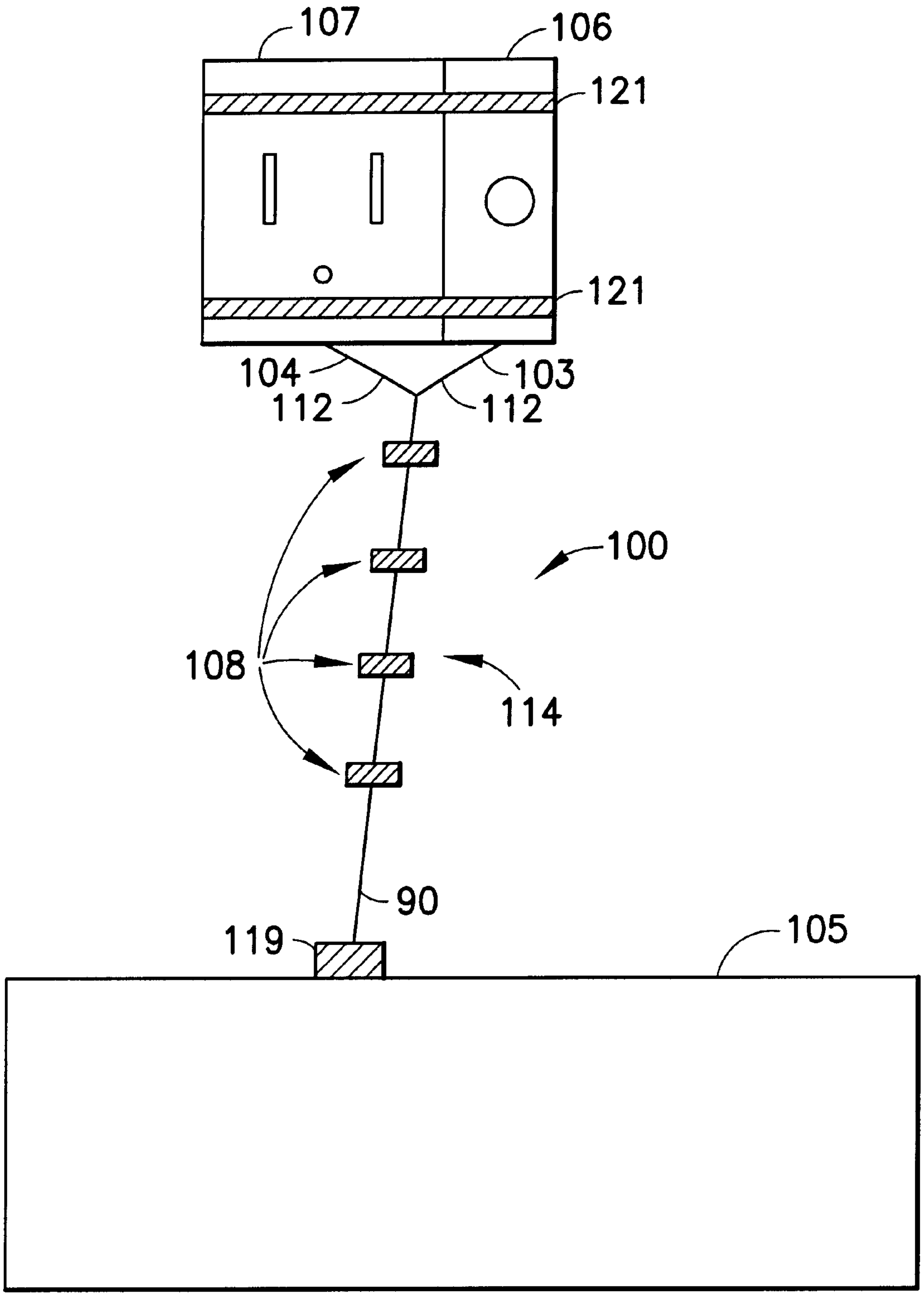
FIG. 5 is a front view of showing an embodiment of the plug joining mechanism of the present invention.

Rings 108 may be rigid rings as shown in FIGS. 1 and 2. Alternately, rings 108 may be embodied as elastic bands, wire-ties or strips of repeatably-connectable fabric, such as Velcro™, as shown in FIG. 5.

Figure 4A:
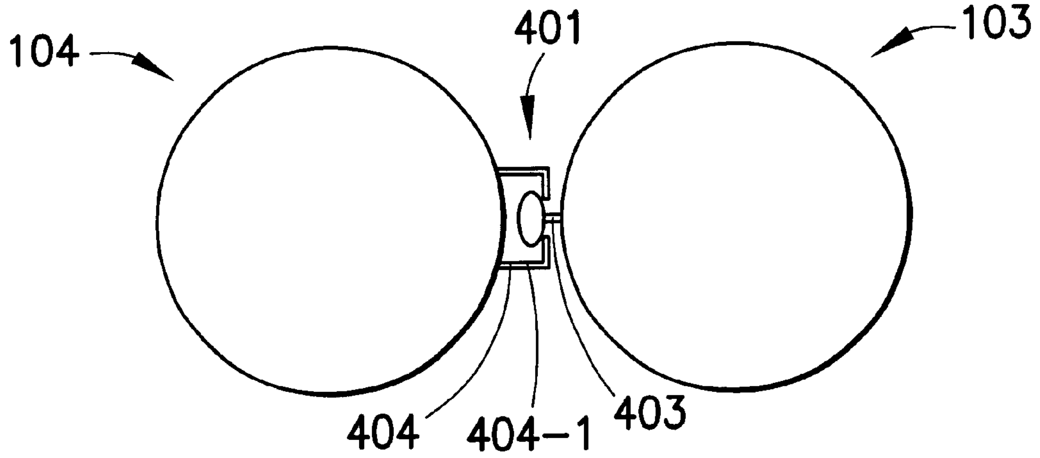
FIG. 4*a* is a side view showing an external groove embodiment of the present invention.
Figure 4B:
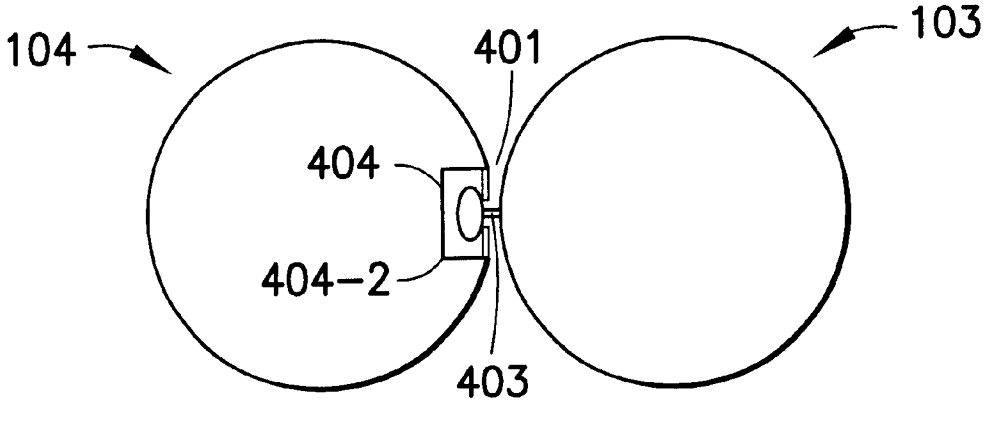
FIG. 4*b* is a side view showing an internal groove embodiment of the present invention.

In the preferred embodiment shown in FIG. 4, cable joining mechanism 114 is a spline and groove mechanism 401. In this embodiment, a spline 403 is molded into the insulation covering of information conductor 103 and a corresponding groove 404 is molded into the insulation covering power conductor 104. Groove 404 may either be an external groove 404-1 as in FIG. 4*a* or an internal groove 404-2 as in FIG. 4*b*. Alternately, spline 403 may be molded into power conductor 104 and groove 404 may be molded into information conductor 103.

FIG. 2 shows cable 100 in use in an environment where the information socket 101 and power socket 102 are integrated into a single socket 202. In this case, information conductor 103 and power conductor 104 are integrated by cable joining mechanism 114 and information plug 106 and power plug 107 are integrated by plug joining mechanism 116 into integrated plug 201.

FIGS. 1 and 2 show a first embodiment of plug joining mechanism 116 for integrating information plug 106 and power plug 107 into integrated plug 201. Information plug 106 has a dovetail protrusion 301' extending from side 305. Power plug 107 has a dovetail indentation 302' disposed within side 307. Side 305 of information plug 106 and side 307 of power plug 107 are secured against one another by inserting protrusion 301' into indentation 302' forming a dovetailed press fit connection between protrusion 301' and indentation 302', thus integrating the plugs creating integrated plug 201. It should be noted that information plug 106 may have dovetail indentation 302' and power plug 107 may have dovetail protrusion 301'.

Figure 3A:
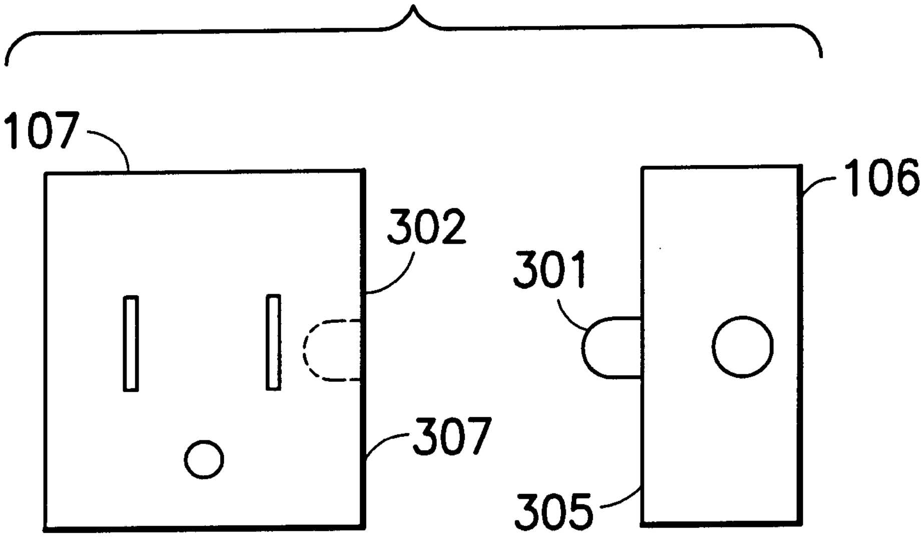
FIG. 3*a* is a front view of an embodiment of the plug joining mechanism for integrating the information plug and the power plug into an integrated plug.
Figure 3B:
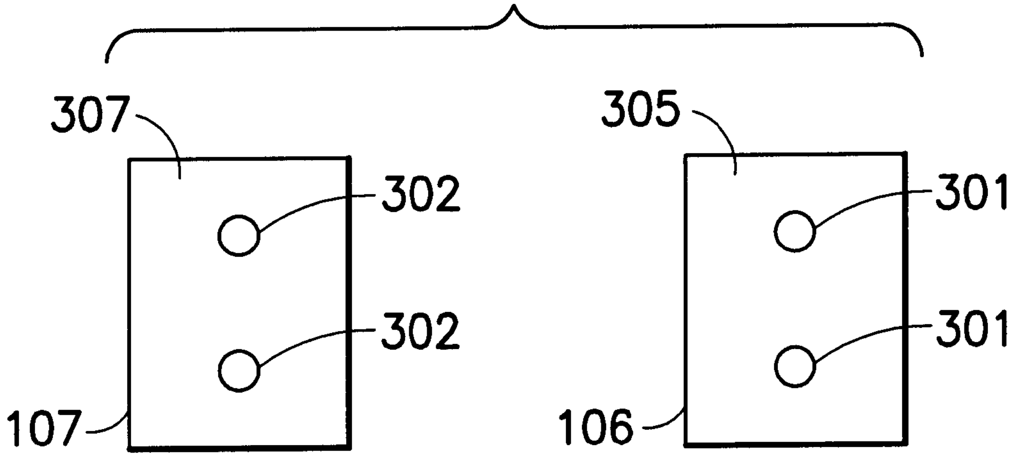
FIG. 3*b* is a side view of the plug joining mechanism of FIG. 3*a;*

FIG. 3 shows another embodiment of plug joining mechanism 116 for integrating information plug 106 and power plug 107 into integrated plug 201. Information plug 106 has a pair of protrusions 301 extending from a side 305. Power plug 107 has a pair of matching indentations 302 disposed within a side 307. Side 305 of information plug 106 and side 307 of power plug 107 are secured against one another by inserting protrusions 301 into indentations 302 forming a press fit connection between protrusions 301 and indentations 302, thus integrating the plugs creating integrated plug 201. It should be noted that information plug 106 may have indentations 302 and power plug 107 may have protrusions 301.

Other plug joining mechanisms 116 such as, but not limited to, snaps or clips could be employed with equal utility. Furthermore, information plug 106 and power plug 107 could be secured together by wrapping with at least one wrapping 121. Wrapping 121 may be an elastic band, a wire-tie or a strip of repeatably-connectable fabric, such as Velcro™, as shown in FIG. 5.

Alternatively, no cable joining mechanism 114 is provided for information conductor 103 and power conductor 104. In this embodiment, information conductor 103 and power conductor 104 are joined only at device plug 111 (or device 105) and at plug joining mechanism 116 as described above.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A plug and cable combination for connecting an information appliance to an information socket and to a power socket, said plug and cable combination comprising:

a power conductor; and an information conductor;

where a first end of said power conductor and a first end of said information conductor are connected to the information appliance through a connecting means;

a second end of said power conductor is connected with a power plug adapted to connect to the power socket for transferring power from the power socket to the information appliance;

a second end of said information conductor is connected with an information plug adapted to connect to the information socket for transferring information between the information socket and the information appliance; and said information plug and said power plug each have a plug joining means disposed thereon, wherein said plug joining means detachably connects said information plug and said power plug into an integrated unitary plug.

2. The plug and cable combination of claim 1 wherein said connecting means comprises a device plug connected to said first ends, said device plug being adapted to connect to a device socket on the information appliance.

3. The plug and cable combination of claim 1 wherein said connecting means comprises a connection terminal on the information appliance.

4. The plug and cable combination of claim 1 wherein at least one of said information conductor and said power conductor includes shielding sufficient to minimize electrical interference.

5. The plug and cable combination of claim 1 wherein said plug joining means comprises at least one protrusion formed on a side of one of said power plug or said information plug and at least one indentation formed on a side of the other of said power plug or said information plug, wherein insertion of said protrusion into said indentation frictionally secures said power plug to said information plug, forming said integrated plug.

6. The plug and cable combination of claim 5 wherein said at least one protrusion is two protrusions and said at least one indentation is two indentations.

7. The plug and cable combination of claim 5 wherein said at least one protrusion is one dovetail protrusion and said at least one indentation is one dovetail indentation.

8. The plug and cable combination of claim 5 wherein said plug joining means comprises a wrapping means.

9. The plug and cable combination of claim 8 wherein said wrapping means is an elastic band, a wire-tie or a repeatedly connectable fabric.

10. The plug and cable combination of claim 1 wherein said power conductor and said information conductor further include a cable joining means capable of detachably connecting said power conductor and said information conductor.

11. The plug and cable combination of claim 10 wherein said power conductor and said information conductor are joined for at least a portion of their entire lengths, from the information appliance, by said cable joining means.

12. The plug and cable combination of claim 10 wherein said cable joining means comprises a plurality of rings that are slidably disposed about said power conductor and said information conductor such that sliding at least one of said rings towards said first ends separates said power conductor from said information conductor, and such that sliding at least one of said rings away from said first ends joins said power conductor to said information conductor.

13. The plug and cable combination of claim 12 wherein said plurality of rings is a plurality of rigid rings, wire-ties, elastic bands or repeatedly connectable fabric rings.

14. The plug and cable combination of claim 10 wherein said power conductor and said information conductor are joined for substantially their entire lengths by said cable joining means.

15. The plug and cable combination of claim 14 wherein said power plug and said information plug are joined forming said integrated plug.

16. A plug and cable combination for connecting an information appliance to an information socket and to a power socket, said plug and cable combination comprising:

a power conductor; and an information conductor;

where a first end of said power conductor and a first end of said information conductor are connected to the information appliance through a connecting means;

a second end of said power conductor is connected with a power plug adapted to connect to the power socket for transferring power from the power socket to the information appliance;

a second end of said information conductor is connected with an information plug adapted to connect to the information socket for transferring information between the information socket and the information appliance; and said information plug and said power plug each have a plug joining means disposed thereon, wherein said plug joining means detachably connects said information plug and said power plug into an integrated unitary plug;

wherein said power conductor and said information conductor further include a cable joining means capable of detachably connecting said power conductor and said information conductor;

wherein said cable joining means comprises a spline and groove means.

17. The plug and cable combination of claim 16 wherein said spline and groove means comprises a groove disposed along at least a portion of the length of one of said power conductor or said information conductor and a spline disposed along at least a portion of the length of the other of said power conductor or said information conductor.

18. The plug and cable combination of claim 17 wherein said groove is an internal groove.

19. The plug and cable combination of claim 17 wherein said groove is an external groove.

20. A method for providing a plug and cable for connecting an information appliance to a combined information and power socket, comprising:

forming an integrated unitary plug by detachably connecting a plug joining means of an information plug to a plug joining means of a power plug;

connecting said integrated plug to the combined information and power socket;

conducting information through said combined socket to or from the information appliance via an information conductor connected to said information plug and connected to the information appliance; and conducting power from said combined socket to the information appliance via a power conductor connected to said power plug and to the information appliance.

* * * * *